US010458651B2

(12) United States Patent
Cool

(10) Patent No.: US 10,458,651 B2
(45) Date of Patent: Oct. 29, 2019

(54) METHOD AND DEVICE FOR DETERMINING WHETHER IGNITION HAS OCCURRED

(71) Applicant: Intergas Heating Assets B.V., NA Coevorden (NL)

(72) Inventor: Peter Jan Cool, Lochem (NL)

(73) Assignee: INTERGAS HEATING ASSETS B.V., Coevorden (NL)

( * ) Notice: Subject to any disclaimer, the term of this patent is extended or adjusted under 35 U.S.C. 154(b) by 63 days.

(21) Appl. No.: 15/550,705

(22) PCT Filed: Feb. 22, 2016

(86) PCT No.: PCT/NL2016/050127
§ 371 (c)(1),
(2) Date: Aug. 11, 2017

(87) PCT Pub. No.: WO2016/133397
PCT Pub. Date: Aug. 25, 2016

(65) Prior Publication Data
US 2018/0023811 A1 Jan. 25, 2018

(30) Foreign Application Priority Data

Feb. 20, 2015 (NL) .................. 2014326
Jul. 10, 2015 (NL) .................. 2015155

(51) Int. Cl.
*F23N 5/20* (2006.01)
*F23N 5/24* (2006.01)
*F23N 5/12* (2006.01)

(52) U.S. Cl.
CPC ........... *F23N 5/242* (2013.01); *F23N 5/203* (2013.01); *F23N 2027/36* (2013.01); *F23N 2031/12* (2013.01)

(58) Field of Classification Search
CPC ................ F23N 5/20; F23N 5/12; F23N 5/24
(Continued)

(56) References Cited

U.S. PATENT DOCUMENTS 3,973,898 A * 8/1976 Seider .................... F23N 5/082
431/76
4,150,005 A * 4/1979 Gehman ............... C08F 263/04
524/533
(Continued)

FOREIGN PATENT DOCUMENTS

JP S54-50777 4/1979
JP S63154952 10/1988
(Continued)

OTHER PUBLICATIONS

International Search Report and Written Opinion dated Aug. 23, 2016 for International Application No. PCT/NL2016/050127.
(Continued)

*Primary Examiner* — Gregory L Huson
*Assistant Examiner* — Nikhil P Mashruwala
(74) *Attorney, Agent, or Firm* — Patterson + Sheridan, LLP

(57) ABSTRACT

The invention relates to a method and a device for determining in a heating appliance whether ignition of the mixture of fluid fuel and air has taken place, comprising the following steps of: applying an electrical ignition signal to a measuring circuit; filtering a combustion signal from the ignition signal; comparing the detected combustion signal to a predetermined pattern; and establishing that the anticipated combustion signal took place during a predetermined period of time.

9 Claims, 6 Drawing Sheets

(58) Field of Classification Search
USPC ........................................................ 431/1, 25
See application file for complete search history.

(56) References Cited

U.S. PATENT DOCUMENTS

| | | | |
|---|---|---|---|
| 4,622,005 A | | 11/1986 | Kuroda |
| 5,599,180 A | | 2/1997 | Peters et al. |
| 5,606,117 A | * | 2/1997 | Vogel .................... G01L 9/0052 73/114.18 |
| 6,222,719 B1 | | 4/2001 | Kadah |
| 2003/0064335 A1 | | 4/2003 | Canon |

FOREIGN PATENT DOCUMENTS

| | | |
|---|---|---|
| JP | H02-62253 | 5/1990 |
| JP | H07-117241 | 12/1995 |
| WO | 2010002255 A1 | 1/2010 |

OTHER PUBLICATIONS

English translation of Office Action in Japanese Patent Application No. 2017-544013, dated Jun. 25, 2019.

* cited by examiner

METHOD AND DEVICE FOR DETERMINING WHETHER IGNITION HAS OCCURRED

Applicant very successfully markets heating appliances which can be produced efficiently owing to the embedding of one or more heat exchangers in a casting. This known heating appliance is provided with an ignition pin for igniting a gas-air mixture.

The present invention relates to a method for determining in the heating appliance whether ignition of a mixture of fluid fuel and air has taken place, comprising the following steps of:
- applying an electrical ignition signal to a measuring circuit;
- filtering a combustion signal from the ignition signal;
- comparing the detected combustion signal to a predetermined pattern; and
- establishing that the anticipated combustion signal took place during a predetermined period of time.

As a result of the present method it is possible to reliably detect whether ignitions have taken place or whether repeated ignition can be dispensed with and/or ignition does not take place or takes place too late, whereby a dangerous amount of gas-air mixture becomes present in or outside the heating appliance. Since most modern CH appliances exchange information with service or manufacturer, it is possible to ascertain at an early stage that combustion does not always take place the first time of ignition.

The present invention further provides a device for determining in the heating appliance whether the combustion of the mixtures of fluid fuel and air has taken place, comprising:
- measuring means to which an electrical ignition signal has been applied;
- filter means for filtering a combustion signal from the ignition signal;
- comparing means for comparing the filtered combustion signal to a predetermined pattern; and
- determining means for establishing whether the combustion signal occurred during a predetermined period of time.

The device preferably comprises a filter section in order to filter out the relatively low frequency of the ignition signal at relatively high voltage.

In order to recognise two peaks from the combustion signal, amplification and rectification preferably take place successively here in an amplifier section.

In order to precisely establish the beginning of a combustion signal a trigger section is preferably connected in parallel to the filter section and the amplifier section.

A first logical section is preferably connected to the output of the amplifier section and a second logical section to the outputs of the first logical section and the trigger section, so that it is possible to detect from a simple square signal that ignition has taken place.

The present invention further provides a heating appliance provided with an ignition pin, wherein the safety is more robust and the distance between the preferably straight ignition pin and protrusion on the heat exchanger, which is preferably embodied as casting, is ensured.

Further advantages, features and details of the present invention will be elucidated on the basis of the following description of a preferred embodiment thereof, wherein reference is made to the following drawing, in which.

Figure 1:
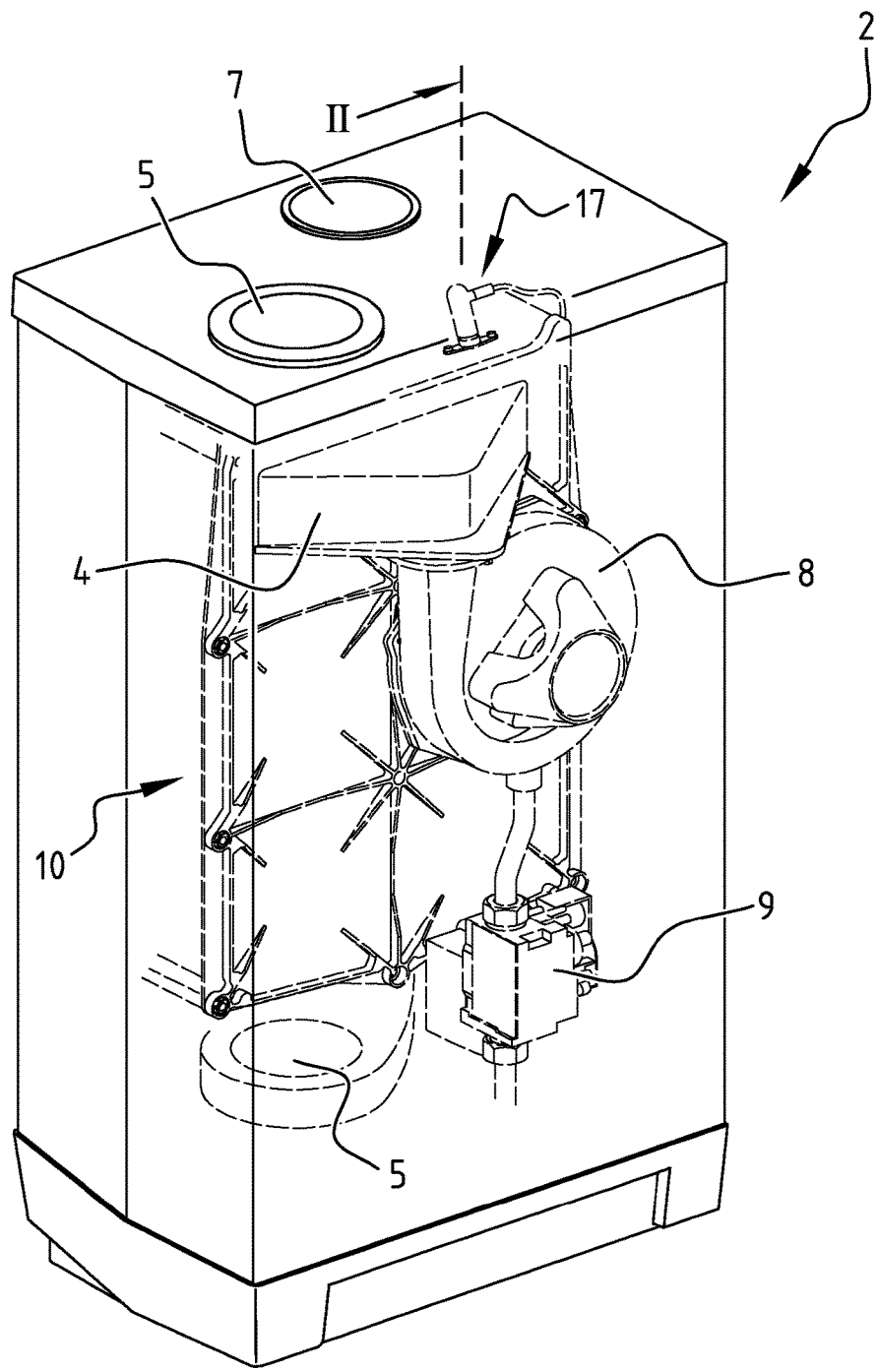
FIG. 1 shows an oblique three-dimensional side view in partial cross-section of a preferred embodiment of the heating apparatus according to the present invention.

The preferred embodiment to be described hereinbelow of the heating appliance with the circuit arranged therein has a number of significant advantages:

The quality of the ignition can be tested precisely and easily before a heating appliance leaves the factory, which means that production errors caused by arranging of ignition pins or other inaccuracies will almost certainly become a thing of the past.

A good operation of the ignition can be well monitored during the whole lifespan of the appliance. If problems occur, information regarding the cause thereof, such as for instance leakage of the ceramic insulating material of the ignition pin whereby irregularities occur in the ignition signal, will be readily available. If the distance between the ignition pin and a part of the appliance (counter-electrode) is incorrect, the signal will show that ignition takes place late or not at all. A possibly occurring (partial) short-circuit in the high-voltage cable likewise result in phenomena which can be detected according to the description of the present patent application.

Drawing of sparks takes place every 20 milliseconds (ms) in practice. On the basis of the result of the present invention it is possible to stop the sparking immediately as soon as the ignition is not detected.

A disadvantage which is observed about such an appliance is that the ignition takes place only after drawing of sparks has taken place repeatedly, whereby an explosion-like ignition takes place, which is undesirable. This can be prevented if the cause of a problematic ignition is detected at an early stage, so that the repeated sparking and/or late ignition, i.e. once a large amount of gas is present, will become a thing of the past.

It is suspected that information regarding the quality of the combustion will in the future also be obtained from the signal processing, while repeated sparking will no longer take place in the future, which is energy-saving and will extend the lifespan of diverse parts.

A heating appliance 2 comprises a burner 4, a heat exchanger 10, a fan 8 and a so-called gas valve control block 9 for supply of gas and air into the space between burner 4 and heat exchanger 10. Fan 8 is fed air via air inlet 7, while the combusted gases are guided out of the appliance and into the flue gas duct via the pipe 5 shown schematically here. An ignition pin 17 is arranged on the housing in the space between burner 4 and heat exchanger 10.

Figure 2:
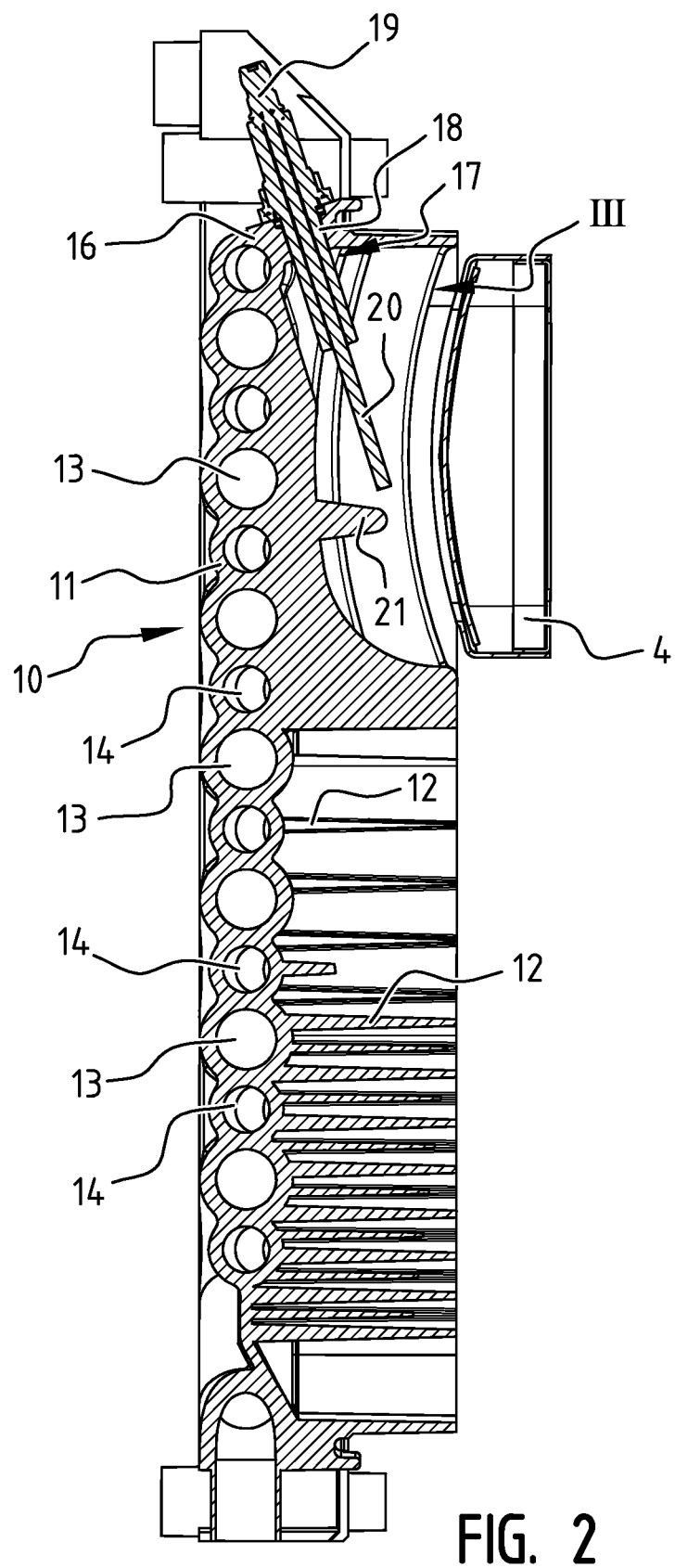
FIG. 2 shows a cross-section along the line II-II of FIG. 1.
Figure 3:
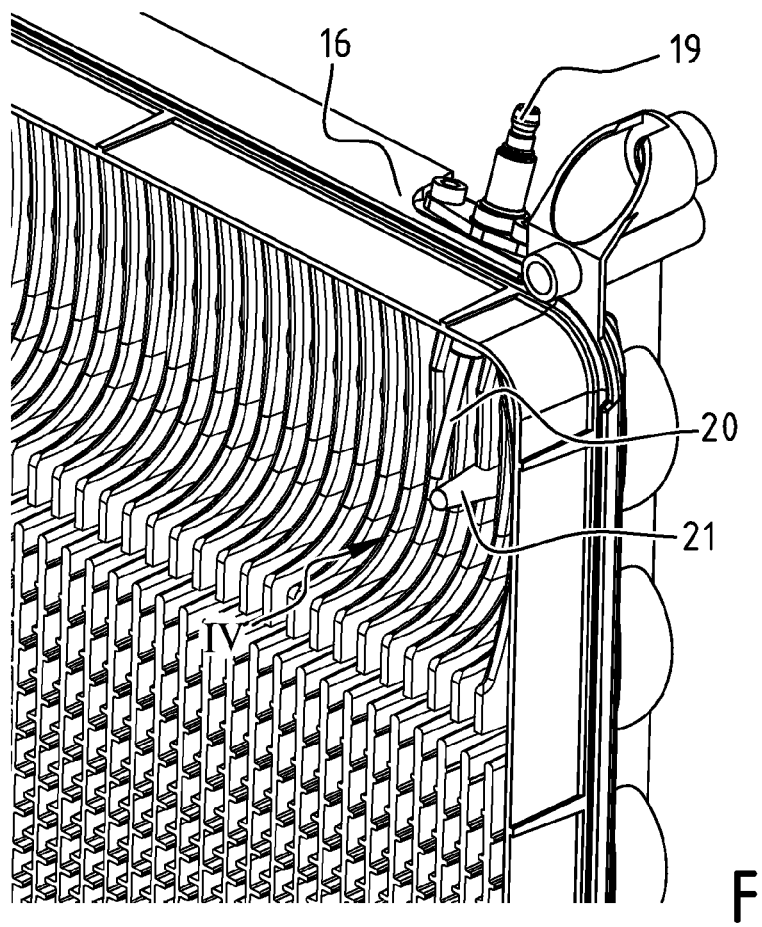
FIG. 3 shows an oblique side view of details III of FIG. 2.
Figure 4:
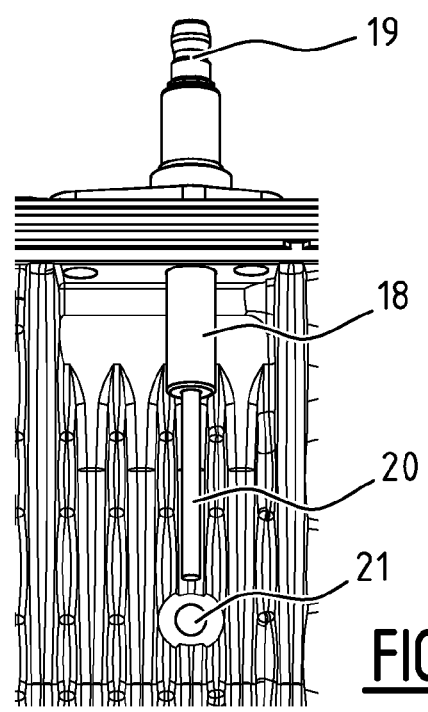
FIG. 4 shows a front view of detail IV of FIG. 3.

Heat exchanger 10 (FIGS. 2, 3, 4) comprises a casting 11 and fins 12 which improve heat exchange, wherein two heat exchangers are arranged in the casting. In the present exemplary embodiment a first heat exchanger comprises relative thick tubes 13 for space heating, while thinner tubes 14 are embedded in casting 11 for hot tap water.

Mounted on an upper flange 16 of the heat exchanger is an ignition unit 17 comprising an ignition pin 20, for instance of FeCrAl material, as well as an insulating sheath 18 and an electrical connection 19. In the present exemplary embodiment casting 16 is provided with a protrusion 21. Ignition pin 20 extends obliquely downward at a small angle to a position close to burner 4, from which a gas-air mixture flows in a manner not shown as soon as the appliance reacts to the demand for space heating and/or hot tap water. In the present embodiment this is a straight pin, i.e. not having a bent outer end, while the heat exchanger is chamfered and provides space for the ignition pin above protrusion 21.

Some inaccuracy may occur during fitting of ignition unit 17, whereby a desired distance between the outer end of the ignition pin and protrusion 21 is in practice not always found to be ensured, while determined tolerances may be exceeded in the course of time due to wear. It is undesirable for a gas-air mixture not to ignite immediately, while it is also undesirable for ignition to continue while the gas-air mixture has already been ignited.

In many existing CH boilers a breakdown is forced between the ignition pin and a (more or less) earthed part, for instance for four seconds and at a frequency of 20 Hz (or 50 Hz, or another frequency), by applying a voltage of about 10 to 50 kV to the ignition pin, wherein there is spark-over at about 6 to 8 kV in the case of a distance of 6 to 8 mm and dry air. The high voltage is generated in known manner using a primary winding, a secondary winding and a capacitor.

Once breakdown has taken place for four seconds a check is made for instance 1 second as to whether the gas-air mixture has combusted. If this is not the case, the gas-air mixture need first be ejected using a fan, after which the cycle can begin again. If ignition still has not been detected after a number of cycles, in the existing appliances an error signal is generated which does not make clear whether the problem is with the gas supply, the ignition or otherwise.

In some cases it is possible that the ignition pin was not adjusted wholly correctly during assembly, whereby ignition cannot proceed as well. An irregularity can also occur in the pattern of the ignition sparks due to a short-circuit or poor earthing, while it is also possible for switches in the gas valve control block or ignition mechanism to function poorly or not at all.

The preferred embodiment of the present invention is based on the insight that it is possible to establish from a pattern of a detected combustion signal that the non-combustion of the gas-air mixture is for instance due to a faulty ignition, or that this pattern shows that ignition sparks form a regular pattern, whereby the cause would more likely be an error in gas supply.

This information is particularly valuable when such information can be obtained remotely by a service engineer and a probable cause of the problems can therefore be established. It will further in all likelihood be possible to reduce the duration of sparking from for instance 4 seconds to 2 seconds once a reliable operation of the whole has been ascertained for a longer period of time, so that the chance of prolonged flowing out of air-gas mixture is reduced and safety is further increased.

A preferred embodiment of a circuit 30 (FIG. 5) comprises a hand-pass filter 31, an amplifier stage 32, a trigger portion 33 and two respective logical portions 34 and 35. Band-pass filter 31 comprises a number of resistors 41, 42, 43 and capacitors 44, 45, 46, the values of which are chosen such that only relatively low-frequency signals, for instance no higher than 3 kHz, are passed to the signal applied to input A.

Amplifier portion 32 comprises resistors 51, 52, 53, 54, 55, 56, 57 and 58, two transistors 61, 62 connected in series, capacitors 66, 67, 68, 69 and a diode 71.

Trigger section 33 comprises a comparator 81 and resistors 82, 83, 84, 85, wherein this section is connected on one side to earth (GND) and on the other to the supply voltage $V_{cc}$ of for instance 5 V (or 10 V).

A logical section 34 comprises resistors 90, 91, ICs 92, 93, a further resistor 94 and capacitors 95, 96. The logical output section 35 comprises two respective logical ports 101 and 102.

In a second preferred embodiment of a circuit 130 (FIG. 6) the acquisition of the components is more advantageous.

The second preferred embodiment of circuit 130 comprises a filter portion 131, an amplifier portion 132, a trigger portion 133 and two respective logical portions 134 and 135.

Amplifier portion 132 comprises capacitors 141, 142, 143, 144 and resistors 145, 146 and 147. Amplifier portion 132 comprises transistors 151, 152, 153, Zener diodes 154, 155, capacitors 156, 157, resistors 158, 159, 160, 161, 162, 163, 164, 165, 166 and 167 and a capacitor 169.

Trigger portion 143 comprises capacitors 170, 171, 172, an operational amplifier 173 and resistors 174, 175, 176, 177 and 178.

The first logical portion 134 comprises an IC 180, capacitors 181, 182 and resistors 183, 184. The second logical section 135 comprises an IC 190, a capacitor 191 and a resistor 192.

Figure 7A:
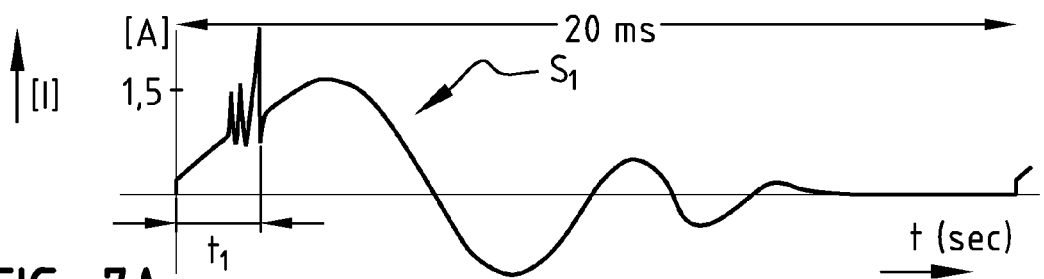
FIGS. 7A-7G show schematic views of respective signals as they occur in the preferred embodiment of the electrical signals as according to the circuit diagrams of FIGS. 5 and 6.

A high voltage of for instance 15 kV, as is required for the ignition pin, is generated via a transformer 101 with a primary winding 102 and second rewinding 103 by means of an alternating voltage of for instance 230 Volt applied between earth and mains voltage ($V_g$), so that a current 105 of for instance 1.5 Ampère (A) begins to run via a resistor 104 with a relatively low ohmic value, about 10Ω, and a TVS (Transient Voltage Suppression) diode, see FIG. 7A. At such a value of 1.5 A breakdown then takes place, which is characterized by one or two peaks before achieving the main peak, which shows that breakdown has taken place.

Figure 5:
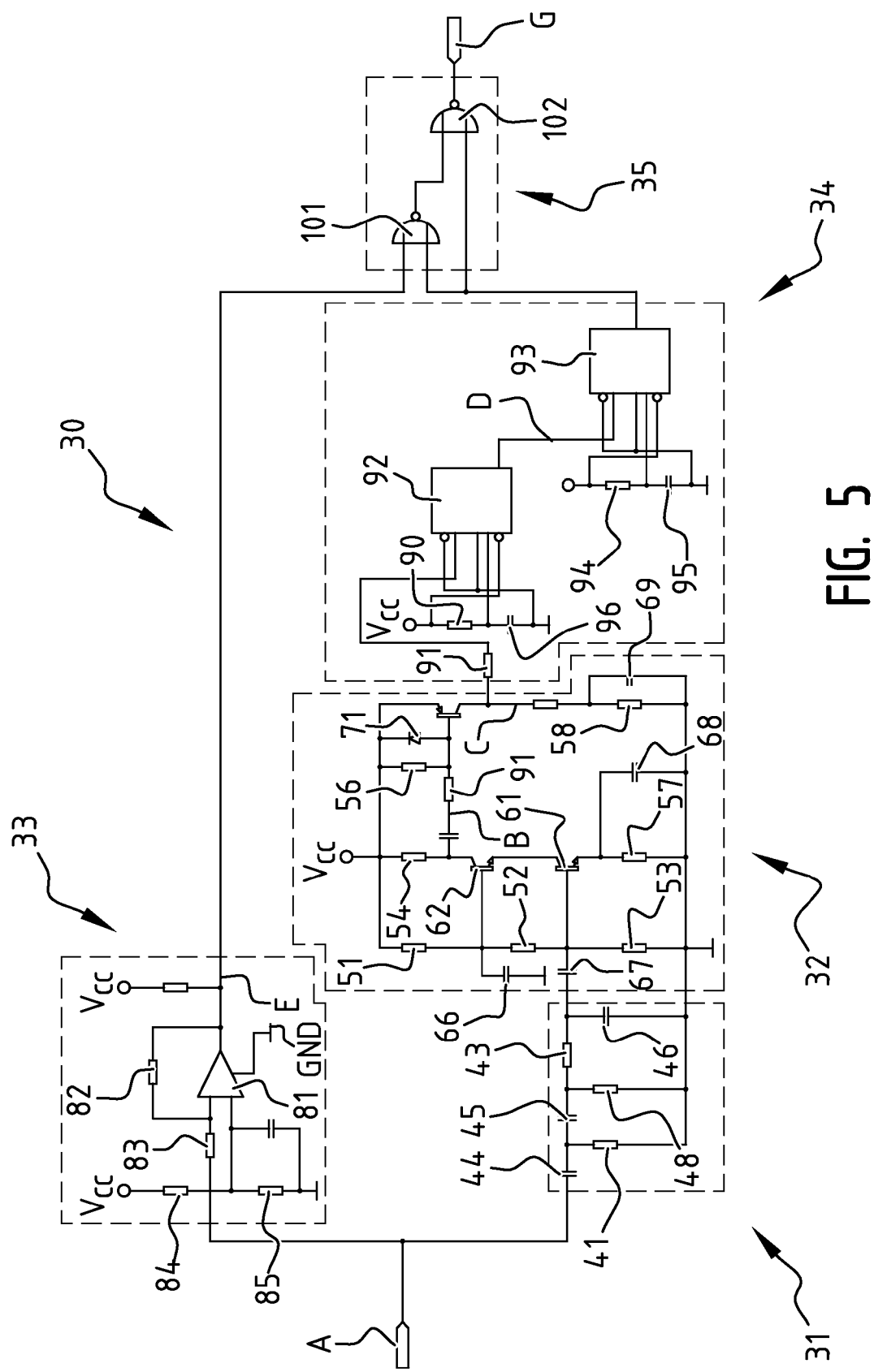
FIG. 5 shows a circuit diagram of a preferred embodiment of a circuit to which a signal which is applied to the ignition pin is connected in order to determine whether ignition has taken place.
Figure 6:
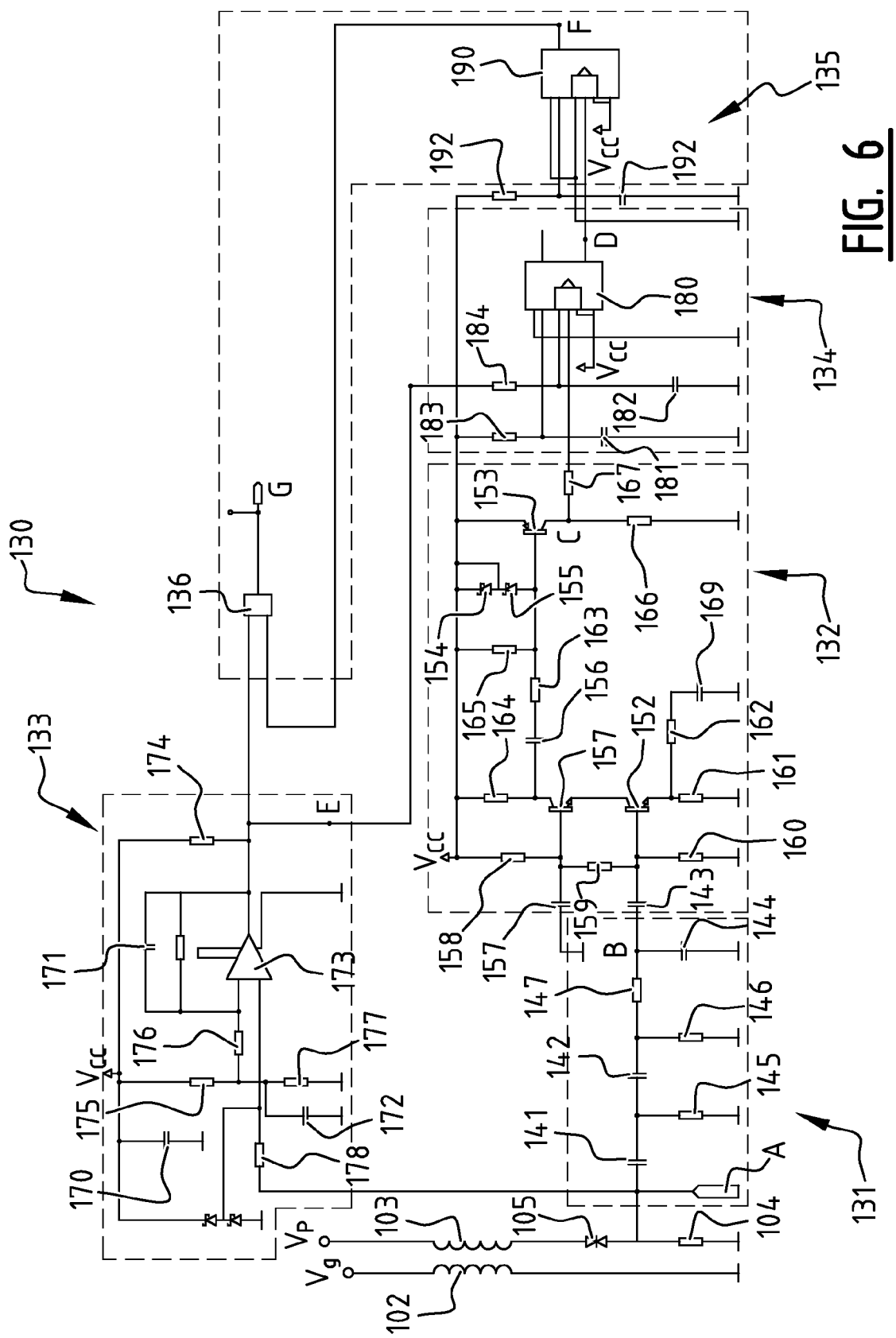
FIG. 6 shows a circuit diagram of a second embodiment of the circuit.

At a moment in time $t_1$ (FIG. 7A) a somewhat unstructured combustion signal results on the alternating current signal applied to the ignition pin, superimposed on this alternating current signal at the input A of the circuits of FIGS. 5 and 6.

Figure 7B:
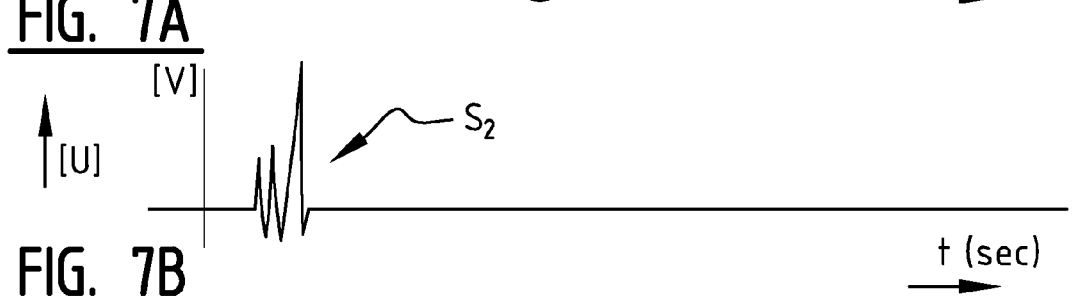
Figure 7C:
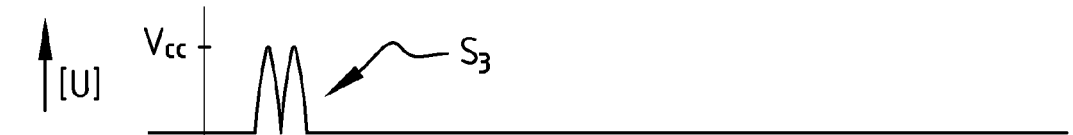
Figure 7D:
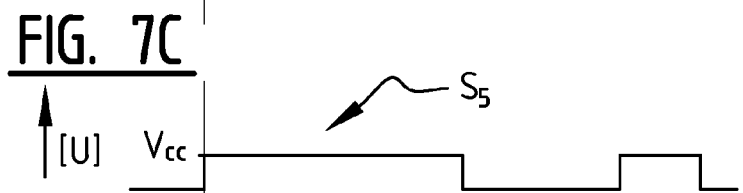
Figure 7E:
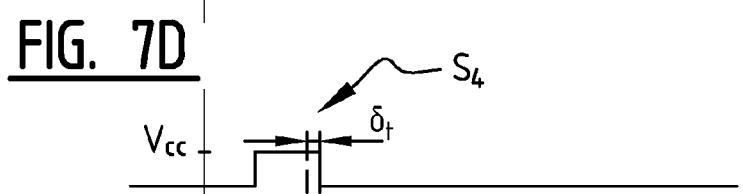
Figure 7F:
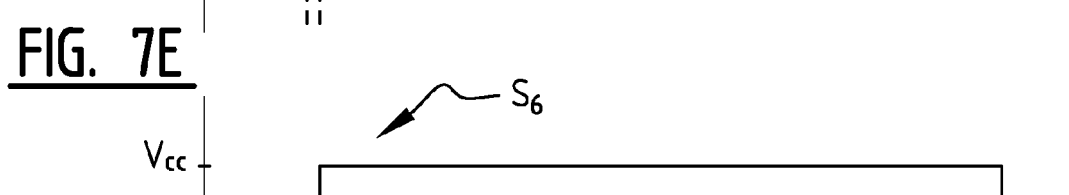
Figure 7G:

The duration up to moment in time $t_1$ is a measure of the ignition distance and the insulation (see also FIG. 7G).

The ignition signal $S_1$ is filtered out by hand-pass filter 31 so that a schematically shown signal $S_2$ (FIG. 7B) becomes present at point B in the circuit diagram of FIGS. 5 and 6. After amplification by the amplifier stage, the signal $S_3$ of FIG. 7C results at point C in the circuits of FIGS. 5 and 6.

Following a logical section 34, signal $S_4$ of FIG. 7E is available at point D, the length thereof depending on the number of current peaks which have occurred (FIG. 7C). These current peaks can results a maximum of 100 ns after each other. The rising edge results during the first current peak, and the falling edge will take place if no more peaks are detected after 150 ns (δt FIG. 7D).

As shown in FIG. 7C, the characteristic is that, after a first peak, a second peak is also available within about 100 nanoseconds. The falling edge of the signal in FIG. 7D occurs 150 nanoseconds after the combustion peak.

Because section 33 (FIG. 5) and 133 (FIG. 6) generates a square wave which is related to the positive side of the alternating current which is supplied at point A, the signal $S_5$ in FIG. 7D will result at point E in FIG. 6. Because this signal indicates a starting moment, only the first rising edge is relevant. The rest of the damping alternating current signal is masked. This masking becomes active when all current peaks have taken place signal $S_6$ (FIG. 7F) point F in FIG. 6. A combination of the signals $S_6$ and $S_5$ is made by a logical port 35 (FIG. 5) or 136 (FIG. 6) so that a signal remains which is equal to the period of time until $t_1$ (see FIG. 7G).

The period of time between a falling edge of the signal $S_4$ and a new rising edge of the signal $S_1$ amounts to for instance about 5 ms. A square signal with a period of for instance 1.25 ms is each time made by the trigger section by amplification up to the supply voltage $V_{cc}$.

Logical combination of the signal of FIG. 7E with the signal of FIG. 7F results in a signal at output F (FIG. 7G) which shows that the ignition signal time $t_1$ has occurred, following which it is found within 1-1.5 ms that ignition has not taken place again.

For the sake of clarity: study of the spark-over has shown that pre-discharges often occur, followed by the actual main discharge and spark-over. The circuit has for its object to determine the time interval between the beginning of the build-up of voltage and the main discharge. This is realized by waiting for a subsequent discharge for a period of δt following detection of a discharge (see also 7E). The time interval until the spark-over (FIG. 7G) is therefore the time until the main discharge plus δt.

Owing to the above described preferred embodiment little unnecessarily repeated ignition takes place, while it is possible to recognise at an early stage that problems are occurring in respect of ignition, since modern heating appliances can be read remotely by the manufacturer and/or maintenance service, making it possible to track the fact that, after some time, repeated ignition has to take place, whereby maintenance can be carried out early and/or dangerous situations can be avoided.

Owing to the above described device and method the time is measured from the beginning of the build-up of charge at the coil until the time of spark-over. If such a sparking time amounts to 20 milliseconds, there are 50 measured sparking times per second.

Before starting the boiler, i.e. before a gas-air mixture is introduced, the sparking time can be measured so that leakage voltage via ceramic insulating material or too great an ignition distance can be determined.

About a second after the boiler is started the mixture has flowed all the way up to the burner, after which this sparking time will decrease greatly by about 20%.

As outlined above, the ignition is thus monitored according to the present patent application, wherein detection of a possible cause of an error takes place, the moment of combustion during start-up of the appliance is established, and information regarding the combustion quality can also be obtained, preferably likewise remotely, in the long term.

The present invention is not limited to the following claims, within the scope of which many modifications can be envisaged.

The invention claimed is:

1. Method for determining in a heating appliance whether ignition of a mixture of fluid fuel and air has taken place, comprising the following steps of:
    applying an electrical ignition signal to a measuring circuit;
    filtering a combustion signal from the ignition signal;
    comparing the detected combustion signal to a predetermined pattern; and
    establishing that the anticipated combustion signal took place during a predetermined period of time.

2. Method as claimed in claim 1, wherein the filtered combustion signal is amplified.

3. Method as claimed in claim 1, wherein the predetermined period of time begins at a trigger moment which is derived from the combustion signal.

4. Device for determining in a heating appliance whether ignition of a mixture of fluid fuel and air has taken place, comprising:
    measuring means to which an electrical ignition signal has been applied;
    filter means for filtering a combustion signal from the ignition signal;
    comparing means for comparing the filtered combustion signal to a predetermined pattern; and
    determining means for establishing whether the combustion signal occurred during a predetermined period of time.

5. Device as claimed in claim 4, comprising an input and a filter section connected to the input.

6. Device as claimed in claim 5, provided with an amplifier section connected to the filter section.

7. Device as claimed in claim 6, provided with a trigger section connected in parallel to the filter section and the amplifier section.

8. Device as claimed in claim 7, provided with a first logical section which is connected to the output of the amplifier section.

9. Device as claimed in claim 8, wherein a second logical section is connected to the output of the trigger section and the first logical section.

* * * * *